(12) United States Patent
Adair et al.

(10) Patent No.: US 9,230,258 B2
(45) Date of Patent: Jan. 5, 2016

(54) SPACE AND TIME FOR ENTITY RESOLUTION

(75) Inventors: Gregery Gene Adair, Henderson, NV (US); Jeffrey James Jonas, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 723 days.

(21) Appl. No.: 12/752,386

(22) Filed: Apr. 1, 2010

(65) Prior Publication Data

US 2011/0246494 A1    Oct. 6, 2011

(51) Int. Cl.
| G06F 7/00 | (2006.01) |
| G06F 17/00 | (2006.01) |
| G06F 17/30 | (2006.01) |
| G06Q 30/02 | (2012.01) |
| H04W 4/02 | (2009.01) |

(52) U.S. Cl.
CPC ............ *G06Q 30/02* (2013.01); *G06F 17/3015* (2013.01); *G06F 17/30241* (2013.01); *H04W 4/02* (2013.01)

(58) Field of Classification Search
CPC ...................................................... G06F 17/30
USPC .................................. 707/610, 692, 737, 758
See application file for complete search history.

(56) References Cited

U.S. PATENT DOCUMENTS

| 4,773,861 A | 9/1988 | Dufour |
| 5,895,465 A * | 4/1999 | Guha ............................ 707/714 |
| 5,991,758 A * | 11/1999 | Ellard ..................................... 1/1 |
| 6,943,724 B1 | 9/2005 | Brace et al. |
| 7,096,259 B1 | 8/2006 | Gray et al. |
| 7,366,632 B2 | 4/2008 | Hamann et al. |
| 7,373,246 B2 * | 5/2008 | O'Clair .......................... 701/532 |
| 7,926,111 B2 | 4/2011 | Oliver et al. |
| 7,966,291 B1 * | 6/2011 | Petrovic et al. ............... 707/641 |
| 8,015,137 B2 * | 9/2011 | Allen et al. ...................... 706/45 |
| 8,204,213 B2 | 6/2012 | Hunt et al. |

(Continued)

FOREIGN PATENT DOCUMENTS

| CN | 102567439 A | 7/2012 |
| CN | 102568035 A | 7/2012 |

(Continued)

OTHER PUBLICATIONS

Jeff Jonas "Entity Resolution Systems vs. Match Merge/Merge Purge/List De-duplication Systems". Sep. 25, 2007. http://jeffjonas.typepad.com/jeff_jonas/2007/09/entity-resoluti.html.*

(Continued)

*Primary Examiner* — James Trujillo
*Assistant Examiner* — Cheryl M Shechtman
(74) *Attorney, Agent, or Firm* — Janaki K. Davda; Konrad, Raynes, Davda & Victor LLP

(57) ABSTRACT

Provided are techniques for receiving a record, wherein the received record has a space-time feature, selecting candidate entities using the space time feature, performing space time analysis to determine whether the received record should be conjoined with a candidate entity from the candidate entities, and, in response to determining that the received record should be conjoined with the candidate entity, making an entity resolution assertion by conjoining the received record and the candidate entity to form a newly conjoined entity.

24 Claims, 12 Drawing Sheets

(56) References Cited

U.S. PATENT DOCUMENTS

| | | | |
|---|---|---|---|
| 8,229,766 | B2 | 7/2012 | Carttar et al. |
| 8,244,502 | B2 | 8/2012 | Hamann et al. |
| 8,306,794 | B2 | 11/2012 | Hamann et al. |
| 2002/0095319 | A1 | 7/2002 | Swart et al. |
| 2003/0130987 | A1* | 7/2003 | Edlund et al. ............... 707/3 |
| 2004/0203868 | A1 | 10/2004 | Eidson |
| 2004/0210763 | A1 | 10/2004 | Jonas |
| 2007/0067285 | A1 | 3/2007 | Blume et al. |
| 2007/0132767 | A1 | 6/2007 | Wright et al. |
| 2008/0033933 | A1* | 2/2008 | Cookson et al. ............ 707/5 |
| 2008/0098008 | A1* | 4/2008 | Eid ........................... 707/100 |
| 2008/0120271 | A1 | 5/2008 | Hunt et al. |
| 2008/0125969 | A1 | 5/2008 | Chen et al. |
| 2008/0243885 | A1* | 10/2008 | Harger et al. ............ 707/100 |
| 2008/0288193 | A1 | 11/2008 | Claassen et al. |
| 2009/0006349 | A1 | 1/2009 | Fuxman et al. |
| 2009/0012898 | A1* | 1/2009 | Sharma et al. ............ 705/44 |
| 2009/0055719 | A1 | 2/2009 | Cossins et al. |
| 2009/0077113 | A1 | 3/2009 | Fidaali et al. |
| 2009/0106242 | A1* | 4/2009 | McGrew et al. ............ 707/6 |
| 2009/0157593 | A1 | 6/2009 | Hayashi et al. |
| 2009/0164811 | A1 | 6/2009 | Sharma et al. |
| 2009/0234869 | A1* | 9/2009 | Azvine et al. ............ 707/101 |
| 2009/0248687 | A1* | 10/2009 | Su et al. ..................... 707/6 |
| 2009/0248738 | A1 | 10/2009 | Martinez et al. |
| 2009/0265106 | A1 | 10/2009 | Bearman et al. |
| 2009/0326879 | A1 | 12/2009 | Hamann et al. |
| 2009/0326884 | A1 | 12/2009 | Amemiya et al. |
| 2010/0197318 | A1 | 8/2010 | Petersen et al. |
| 2011/0040532 | A1 | 2/2011 | Hamann et al. |
| 2011/0060561 | A1 | 3/2011 | Lugo et al. |
| 2011/0087495 | A1 | 4/2011 | O'Neill et al. |
| 2011/0302128 | A1 | 12/2011 | Hayashi et al. |
| 2012/0029956 | A1 | 2/2012 | Ghosh et al. |
| 2012/0084859 | A1 | 4/2012 | Radinsky et al. |
| 2012/0089859 | A1 | 4/2012 | Wang et al. |
| 2012/0106738 | A1 | 5/2012 | Belenkiy et al. |
| 2012/0166347 | A1 | 6/2012 | Lacal |
| 2012/0226889 | A1 | 9/2012 | Merriman et al. |
| 2012/0320815 | A1 | 12/2012 | Massena |
| 2014/0019544 | A1 | 1/2014 | Palmert |
| 2014/0123300 | A1 | 5/2014 | Jung et al. |
| 2014/0257740 | A1 | 9/2014 | Hamann et al. |
| 2014/0270482 | A1 | 9/2014 | Chakraborty et al. |
| 2015/0098565 | A1 | 4/2015 | Jonas et al. |
| 2015/0101061 | A1 | 4/2015 | Jonas et al. |

FOREIGN PATENT DOCUMENTS

| | | | |
|---|---|---|---|
| JP | 2010237832 | A | 10/2010 |
| WO | 2010065429 | | 6/2010 |

OTHER PUBLICATIONS

Dey, D.; Sarkar, S.; De, P.; , "A distance-based approach to entity reconciliation in heterogeneous databases," Knowledge and Data Engineering, IEEE Transactions on , vol. 14, No. 3, pp. 567-582, May/Jun. 2002 doi: 10.1109/TKDE.2002.1000343.*

Christen, P. and R. Gayler, "Towards Scalable Real-Time Entity Resolution Using a Similarity-Aware Inverted Index Approach", © 2008, Australian Computer Society, Inc., Total 10 pp (Also The Australian National University, Canberra ACT 0200, 2008).

Jonas, J., "Jeff Jonas: Entity Resolution Systems Vs. Match Merge/ Merge Purge/List De-duplication Systems", [online], [Retrieved on Nov. 20, 2009]. Retrieved from the Internet at <URL: http://jeffjonas. typepad.com/jeff_jonas/2007/09/entity-resoluti.html>, Total 5 pp.

Jonas, J., "Threat and Fraud Intelligence, Las Vegas Style", © 2006 IEEE, Total 8 pp.

Kang, H., L. Getoor, B. Shneiderman, M. Bilgic, and L. Licamele, "Interactive Entity Resolution in Relational Data: A Visual Analytic Tool and Its Evaluation", IEEE Trans. on vol. 14, No. 5, Sep.-Oct. 2008, pp. 999-1014, Total 16 pp.

Mailin, B. and L. Sweeney, "ENRES: A Semantic Framework for Entity Resolution Modelling", School of Computer Science, Carnegie Mellon University, Nov. 2005, Total 18 pp.

Sheth, A. and M. Perry, "Traveling the Semantic Web Through Space, Time, and Theme", © 2008 IEEE, Total 6 pp (Also IEEE Internet Computing, vol. 12, Iss. 2, Mar.-Apr. 2008, pp. 81-86).

U.S. Appl. No. 13/585,066, filed Aug. 14, 2012, entitled "Context Accumulation Based on Properties of Entity Features", invented by Adair, G.G., R.J. Butcher, and J.J. Jonas, Total 36 pp. [54.96 (Appln)].

English Abstract for CN102567439A, published on Jul. 11, 2012, Total 1 p.

English Abstract for CN102568035A, published on Jul. 11, 2012, Total 1 p.

ISEBOX. © 2010 HumanGeo, LLC: <http://www.thehumangeo.com/solutions_isebox.php>: Downloaded Apr. 9, 2013. pp. 1-2.

Preliminary Amendment, Jun. 23, 2014, for U.S. Appl. No. 14/045,718, filed Oct. 3, 2013 by J.J. Jonas et al., Total 5 pp. [5T351 (PrelimAmend)].

Preliminary Amendment, Jun. 23, 2014, for U.S. Appl. No. 14/312,085, filed Jun. 23, 2014 by J.J. Jonas et al., Total 6 pp. [57.351C1 (PrelimAmend)].

Pugh, William: "Skip Lists: A Probabilistic Alternative to Balanced Trees": Communications of the ACM: vol. 33 Issue 6. New York, NY. Jun. 1990, Total 8 pp.

U.S. Appl. No. 14/045,718, filed Oct. 3, 2013, entitled "Privacy Enhanced Spatial Analytics", invented by J.J. Jonas et al., Total 49 pp. [57.351 (Appln)].

U.S. Appl. No. 14/312,085, filed Jun. 23, 2014, entitled "Privacy Enhanced Spatial Analytics", invented by J.J. Jonas et al., Total 49 pp. [57.351C1 (Appln)].

Whitney, Bill: "Skip Lists in C++": Dr. Dobb's the World of Software Development. Nov. 1, 1998. URL:http://www.drdobbs.com/cpp/skip-lists-in-c/184403579. Downloaded Apr. 9, 2013. pp. 1-12.

Wikipedia, "Circle of Latitude", [online], [Retrieved on Jul. 24, 2013]. Retrieved from the Internet at <URL: en.wikipedia.org/wiki/Circle_of_latitude>, Total 7 pp.

Wikipedia, "Geohash", [online], [Retrieved on Apr. 9, 2013]. Retrieved from the Internet at <URL: http://en.wikipedia.org/wiki/Geohash>, Total 6 pp.

Zhang, Jie. Dissertation: "Spatio-Temporal Aggregates over Streaming Geospatial Image Data": Jun. 2007. <http://www.cs.ucdavis.edu/research/tech-reports/2007/CSE-2007-29.pdf> Downloaded Apr. 9, 2013. pp. 1-145.

Office Action 1, Jul. 30, 2014, for U.S. Appl. No. 13/585,066, filed Aug. 14, 2012 by G.G. Adair et al., Total 15 pp. [54.96 (OA1)].

Response to Office Action 1, Oct. 30, 2014, for U.S. Appl. No. 13/585,066, filed Aug. 14, 2012 by G.G. Adair et al., Total 10 pp. [54.96 (ROA1)].

Final Office Action 1, Dec. 5, 2014, for U.S. Appl. No. 13/585,066, filed Aug. 14, 2012 by G.G. Adair et al., Total 16 pp. [54.96 (FOA1)].

International Search Report, Dec. 2, 2014, for PCT/JP2014/004558, Total 2 pp.

International Search Report and Written Opinion, Dec. 2, 2014, for PCT/JP2014/004558, Total 2 pp.

Singla, P. and P. Domingos, "Entity Resolution with Markov Logic", Data Mining, 2006, Department of Computer Science and Engineering, ICDM'06, Sixth International Conference on IEEE, 2006. [Online], <retrieved Jul. 22, 2014>. <http://www.cse.iitd.ac.in/~parags/papers/erml-icdm06.pdf>, Total 11 pp.

Whang, S.E., O. Benjelloun, and H. Garcia-Molina, "Generic Entity Resolution with Negative Rules", The VLDB Journal, The International Journal on Very Large Data Bases 18.6 (2009): 1261-1277. Received: Mar. 27, 2008, Revised: Jan. 7, 2009, Accepted: Jan. 12, 2009, © Springer-Verlag 2009, Published online: Feb. 28, 2009, [online] <retrieved Jul. 22, 2014> <http://swhig.web.unc.edu/files/2011/10/negativerules.pdf>, Total 17 pp.

Whang, S.E., and H. Garcia-Molina, "Entity Resolution with Evolving Rules", Proceedings of the VLDB Endowment, vol. 3, No. 1, Computer Science Department, Stanford University, © 2010 VLDB Endowment, Total 12 pp. [Also pp. 1326-1337].

English Abstract and Machine Translation for JP2010237832A, published Oct. 21, 2010, Total 27 pp.

(56) References Cited

OTHER PUBLICATIONS

Office Action 1, Dec. 18, 2014, for U.S. Appl. No. 14/045,718, filed Oct. 3, 2013 by J.J. Jonas et al., Total 21 pp. [57.351 (OA1)].

Response to Final Office Action, Feb. 27, 2015, for U.S. Appl. No. 13/585,066, filed Aug. 14, 2012 by G.G. Adair et al., Total 11 pp. [54.96 (RFOA)].

Office Action 3, Apr. 8, 2015, for U.S. Appl. No. 13/585,066, filed Aug. 14, 2012 by G.G. Adair et al., Total 8 pp. [54.96 (OA3)].

Response to Office Action 3, Jul. 8, 2015, for U.S. Appl. No. 13/585,066, filed Aug. 14, 2012 by G.G. Adair et al., Total 11 pp. [54.96 (ROA3)].

US Patent Application, Jun. 30, 2015, for U.S. Appl. No. 14/788,185, filed Jun. 30, 2015, by Kirk K. Krauss et al., Total 43 pp. [57.355 (Appln)].

Maludrottu, S., M. Beoldo, M. Soto Alvarez, and C. Regazzoni, "A Bayesian Framework for Online Interaction Classification", 2010 Seventh IEEE International Conference on Advanced Video and Signal Based Surveillance, © 2010 IEEE, Total 6 pp.

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. and T. Grance, "The NIST Definition of Cloud Computing (Draft)", Jan. 2011, Computer Security Division Information Technology Laboratory National Institute of Standards and Technology, Total 7 pp.

Moussa, W.A., J. Jessel, and E. Dubois, "Notational-based Prototyping of Mixed Interactions", In Proceedings of the 5th IEEE and ACM International Symposium on Mixed and Augmented Reality, © 2006 IEEE, Total 2 pp.

Wikipedia, "Vincenty's Formulae", [online], [Retrieved on Jun. 29, 2015]. Retrieved from the Internet at <URL: https://en.wikipedia.org/wiki/Vincenty%27s_formulae>, page last modified on Apr. 22, 2015, Total 5 pp.

Written Opinion, Dec. 2, 2014, for International Application No. PCT/JP2014/004558, Total 5 pp.

English Abstract for EP2652887, published on Jun. 25, 2014, Total 2 pp.

Response to Office Action 1, Mar. 30, 2015, for U.S. Appl. No. 14/045,718, filed Oct. 3, 2013 by J.J. Jonas et al., Total 9 pp. [57.351 (ROA1)].

Final Office Action, Jul. 14, 2015, for U.S. Appl. No. 14/045,718, filed Oct. 3, 2013 by J.J. Jonas et al., Total 19 pp. [57.351 (FOA)].

Office Action 1, Aug. 10, 2015, for U.S. Appl. No. 14/312,085, filed Jun. 23, 2014 by J.J. Jonas et al., Total 35 pp. [57.351C1GF (OA1)].

Response to Final Office Action, Sep. 21, 2015, for U.S. Appl. No. 14/045,718, filed Oct. 3, 2013 by J.J. Jonas et al., Total 11 pp. [57.351GF (RFOA)].

Response to Office Action, Sep. 21, 2015, for U.S. Appl. No. 14/312,085, filed Jun. 23, 2014 by J.J. Jonas et al., Total 8 pp. [57.351C1GF (ROA)].

\* cited by examiner

| SYSTEM NUMBER AND RECORD NUMBER | TRANSACTION NUMBER | NAME | ADDRESS | PHONE NUMBER |
|---|---|---|---|---|
| SYSTEM 1 - RECORD 1 (S1R1) | S1R1 | BILL SMITH | 123 MAIN ST. | 703 565 1321 |
| SYSTEM 1 - RECORD 2 (S1R2) | S1R2 | KENNY SMITH | PO 19878 | 703 565 9000 |
| SYSTEM 2 - RECORD 1 (S2R1) | S2R1 | WILLIAM K. SMITH | 123 S. MAIN ST. | (703) 565 1321 |

FIG. 3

| SYSTEM NUMBER AND RECORD NUMBER | TRANSACTION NUMBER | NAME | ADDRESS | PHONE NUMBER | DATE | TIME | SPACE |
|---|---|---|---|---|---|---|---|
| SYSTEM 1 - RECORD 1 (S1R1) | S1R1 | BILL SMITH | 123 MAIN ST. | 703 565 1321 | 12/31/09 | 11:58:02 | N//119:46:05:W//14:40:20 |
| SYSTEM 1 - RECORD 2 (S1R2) | S1R2 | KENNY SMITH | PO 19878 | 703 565 9000 | 12/31/09 | 11:58:02 | N//119:46:05:W//14:40:20 |
| SYSTEM 2 - RECORD 1 (S2R1) | S2R1 | WILLIAM K. SMITH | 123 S. MAIN ST. | (703) 565 1321 | 12/31/09 | 11:58:07 | N//122:23:36:W//14:37:11 |

| SYSTEM NUMBER AND RECORD NUMBER | NAME | ADDRESS | SOCIAL SECURITY NUMBER | CREDIT CARD NUMBER |
|---|---|---|---|---|
| SYSTEM 3 – RECORD 1 (S3R1) | MIKE SMITH | 123 MAIN ST. | 111-11-1111 | 1234 5678 9012 3456 |

| SYSTEM NUMBER AND RECORD NUMBER | NAME | ADDRESS | CREDIT CARD NUMBER | PASSPORT NUMBER | RESERVATION NUMBER | DATE/TIME | LOCATION | DESTINATION |
|---|---|---|---|---|---|---|---|---|
| SYSTEM 4 - RECORD 1 (S4R1) | MIKE SMITH | 123 MAIN ST. | 1234 5678 9012 3456 | USA-987654321ABCD | 9999 | | | |

| SYSTEM NUMBER AND RECORD NUMBER | NAME | ADDRESS | MAKE/MODEL | LICENSE PLATE NUMBER | EXPIRATION DATE |
|---|---|---|---|---|---|
| SYSTEM 5 - RECORD 1 (S5R1) | MIKE SMITH | 123 MAIN ST. | ALPHA/ SUV20 | CA 111 AAA | 10/2010 |

| SYSTEM NUMBER AND RECORD NUMBER | NAME | ADDRESS | CREDIT CARD NUMBER | PASSPORT NUMBER | RESERVATION NUMBER | DATE/TIME | LOCATION | DESTINATION |
|---|---|---|---|---|---|---|---|---|
| SYSTEM 6 - RECORD 1 (S6R1) | MIKE SMITH | | | | 9999 | 12-19-2009 4:25 PM | OAKLAND INTERNATIONAL AIRPORT GATE: A15 | CHARLES DE GUALLE INTERNATIONAL AIRPORT PARIS, FRANCE |

FIG. 8

| SYSTEM NUMBER AND RECORD NUMBER | DATE/TIME | LOCATION | MAKE/MODEL | LICENSE PLATE NUMBER | REGISTERED OWNER | REGISTERED ADDRESS |
|---|---|---|---|---|---|---|
| SYSTEM 7 - RECORD 1 (S7R1) | 12-19-2009 4:25 PM | BAY BRIDGE FAST-TRACK BOOTH 2 | ALPHA/ SUV20 | CA 111 AAA | MIKE SMITH | 123 MAIN ST. |

SPACE AND TIME FOR ENTITY RESOLUTION

BACKGROUND

1. Field

Embodiments of the invention relate to using space and time for entity resolution.

2. Description of the Related Art

Entity resolution techniques may be used to determine when two or more entities (e.g., people, buildings, cars, things, other objects, etc.) represent the same physical entity despite having been described differently. Sometimes these techniques are called deduplication, match/merge, identity resolution, semantic reconciliation, or have other names. For example, a first record containing CustID #1 [Bob Jones at 123 Main Street with a Date of Birth (DOB) of 6/21/45] is likely to represent the same entity as a second record containing CustID #2 [Bob K Jones at 123 S. Main Street with a DOB of 6/21/1945]. Entity resolution can be used within a single data source to find duplicates, across data sources to determine how disparate transactions relate to one entity, or used both within and across a plurality of data sources at the same time.

Entities have features (values that are collected or observed that can be more or less discriminating). For example, in the area of human entities, features may include one or more of: name, address, phone, DOB, Social Security Number (SSN), Driver's License (D/L), biometric features, gender, hair color, and so on. By way of example, SSN's are generally very discriminating, dates of birth are less discriminating, and gender is not particularly discriminating at all. As another example, entity resolution on objects, such as a car, may include one or more features of: license plate number, Vehicle Identification Number (VIN), make, model, year, color, owner, and so on.

Features may be used to establish confidence (a degree of certainty that two discreetly described entities are the same). For the example of CustID #1 and CustID #2, the confirming features of name, address, and DOB and the lack of conflicting features (e.g., features in disagreement, such as opposing D/L numbers) probably result in a high enough confidence to assert that the first record and the second record represent the same entity (e.g., person), without human review.

Entity resolution systems are described further in: "Entity Resolution Systems vs. Match Merge/Merge Purge/List De-duplication Systems" by Jeff Jonas, published Sep. 25, 2007.

Now imagine if the first record and the second record were for identical twins (two separate people). Also imagine that each twin is presenting the exact same passport document (same name, same number, same DOB, etc.). Furthermore, consider the improbability of a biometric comparison (iris, fingerprint, etc.) evaluating both twins and the biometric scoring as "same" entity—whether the biometric score resulted from fraud, a faulty biometric technique, or some higher miracle. Despite absolute similarity across the traditional feature space (name, DOB, biometrics, etc.) clearly sufficient to cause an entity resolution technique to assert that the first and second records reflect a single entity, the twins are nonetheless two separate entities (i.e., two separate people).

The human process of determining when things are the same or different includes the physics principles that:

1) the same thing cannot be in two different spaces (e.g., places) at the same time; and 2) two different things cannot occupy the same space at the same time.

For example, assume a person, named Bill, is sitting across the table from a person, named Tom, and talking to Tom. Assume also that Bill was suddenly covered with a blanket and then used a device to change the nature of his voice. Obviously, Tom would not be able to observe any specific features from Bill (i.e., Tom can not see Bill's face or clothes, or hear a Bill's familiar voice, etc.). Nonetheless, Tom would still know with certainty that the person covered by a blanket is, in fact, still Bill. Tom saw Bill cover himself with the blanket, and despite the lack of available features, Tom knows it is Bill under the blanket—an assertion based on the fact two different things cannot occupy the same space at the same time.

Conventional entity resolution systems do not take into account space and time coordinates as means to improve entity resolution accuracy. The use of space and time features, is in fact, essential to advance entity resolution systems. Thus, there is a need for using space and time for entity resolution.

BRIEF SUMMARY

Provided are a method, computer program product, and system for receiving a record, wherein the received record has a space-time feature, selecting candidate entities using the space time feature, performing space time analysis to determine whether the received record should be conjoined with a candidate entity from the candidate entities, and, in response to determining that the received record should be conjoined with the candidate entity, making an entity resolution assertion by conjoining the received record and the candidate entity to form a newly conjoined entity.

BRIEF DESCRIPTION OF THE SEVERAL VIEWS OF THE DRAWINGS

Referring now to the drawings in which like reference numbers represent corresponding parts throughout:

FIG. 2 is formed by FIGS. 2A, 2B, and 2C.

FIG. 3 illustrates a sample data set in accordance with certain embodiments.

FIG. 4 illustrates a sample data set including space feature and time features in accordance with certain embodiments.

FIG. 5 illustrates a sample credit card record in accordance with certain embodiments.

FIG. 6 illustrates a sample airline reservation record in accordance with certain embodiments.

FIG. 7 illustrates a sample vehicle registration record in accordance with certain embodiments.

FIG. 8 illustrates a sample passenger boarding record in accordance with certain embodiments.

FIG. 9 illustrates a sample bridge toll record in accordance with certain embodiments.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
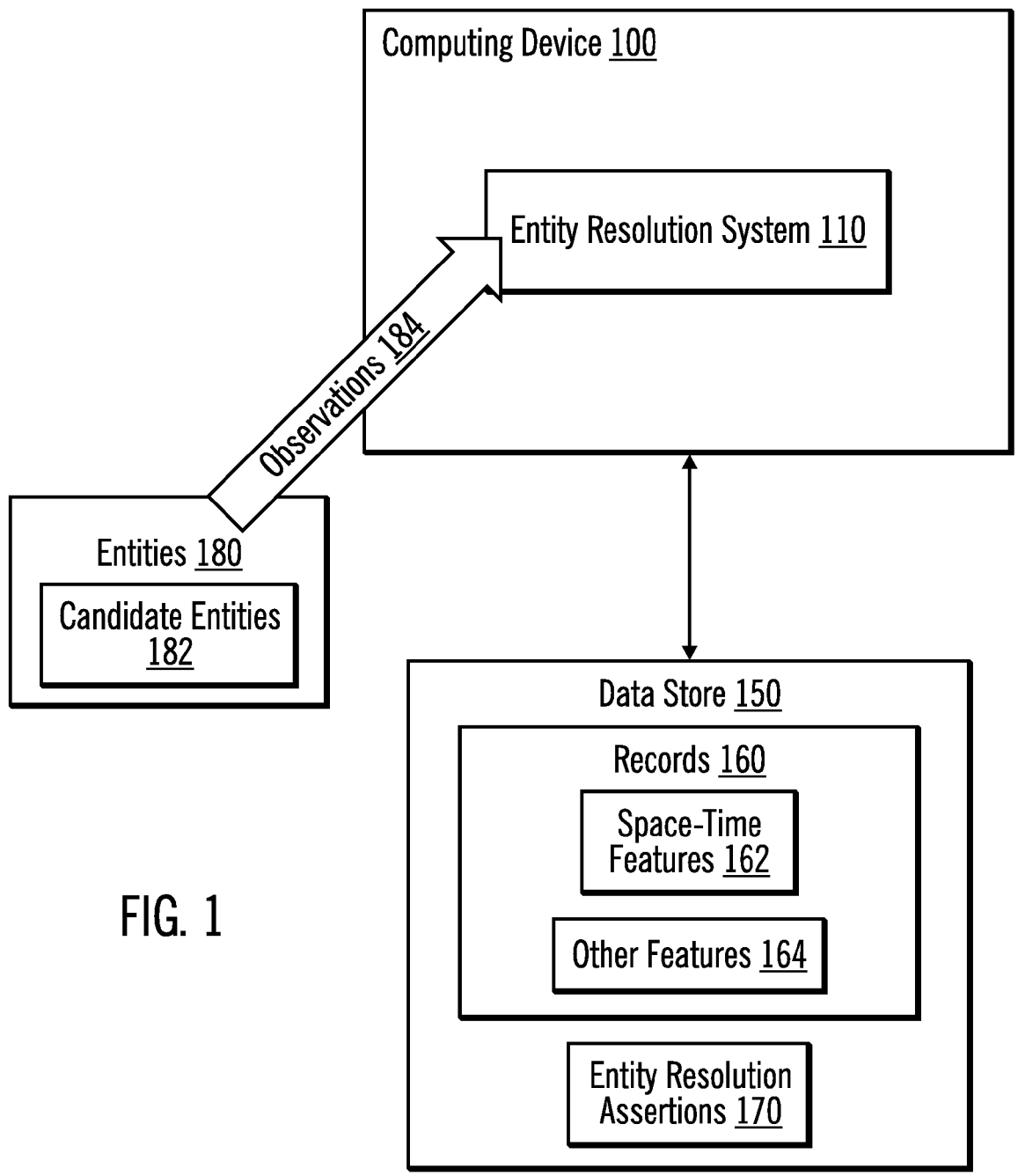
FIG. 1 illustrates a computing architecture in accordance with certain embodiments.
Figure 2A:
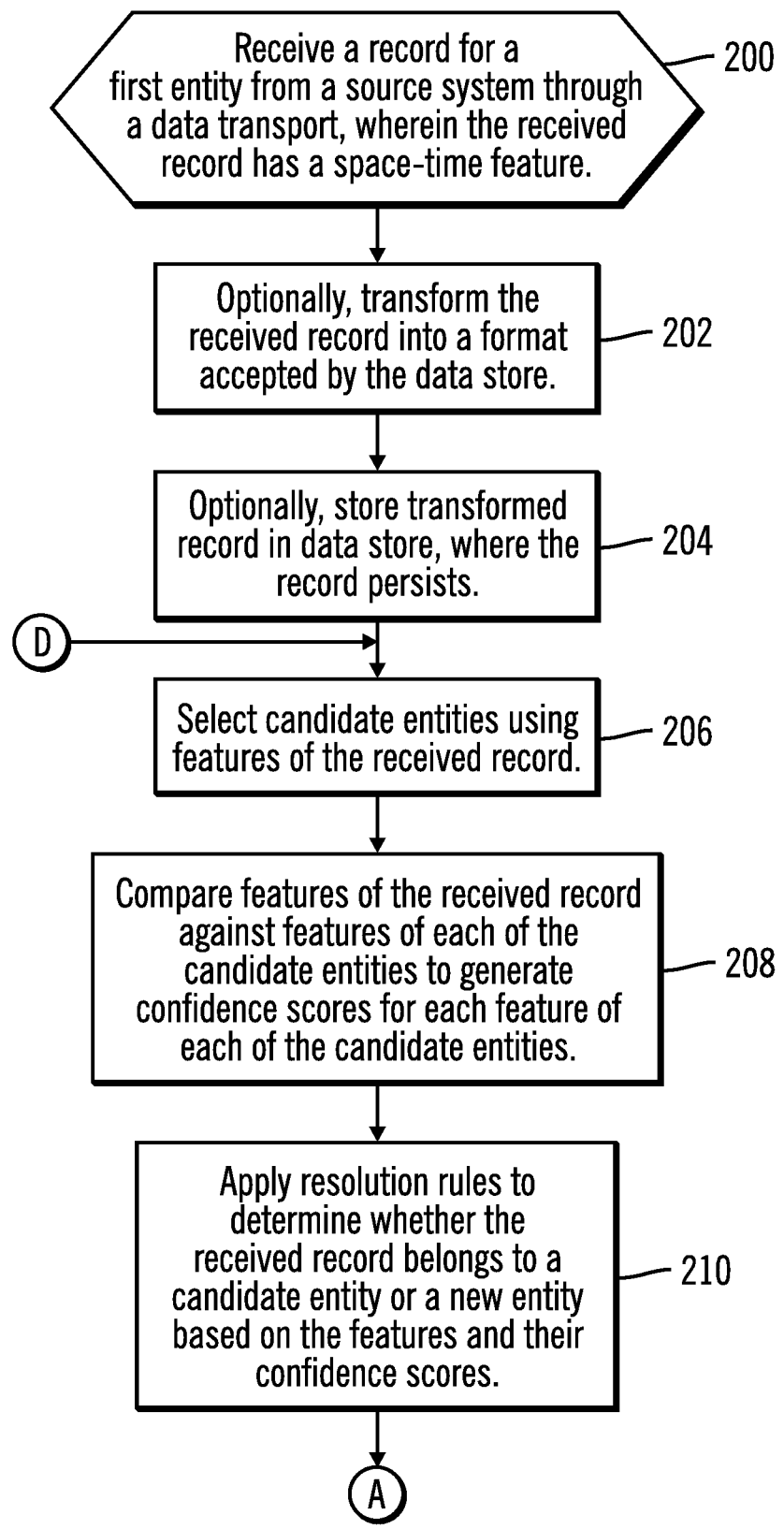
FIG. 2 illustrates logic for performing entity resolution in accordance with certain embodiments.

FIG. 1 illustrates a computing architecture in accordance with certain embodiments. A computing device 100 includes an entity resolution system 110. The computing device 100 is coupled to a data store 150. An entity 180, for example, a person, place or thing. As a more detailed example, the entity 180 may be a building (which may be a place and a thing), a car (which may be a thing and, when not moving, may identify a place), object (e.g., a book), a protein, etc. A subset (one or more) of the entities 180 may be selected as candidate entities 182, as will be discussed with reference to FIG. 2 below. Observations 184 about the entities 180 are collected by the entity resolution system 110.

The data store 150 resides on a computing device, but the data store 150 may or may not reside on computing device 100. The data store 150 may be directly coupled via direct attached disk, Storage Attached Network (SAN), a network switch, Universal Serial Bus (USB), firewire, Inifiniband™ technology, or indirectly via Ethernet network, the Internet, etc. In some embodiments, the data store 150 may be distributed across two or more storage devices, such as a distributed relational database, cloud data storage system, etc.

The data store 150 includes records 160 and entity resolution assertions 170. The records 160 include space-time features 162 and other features 164. Each space-time feature 162 has space (e.g., geolocation, in space which would include the real word or virtual worlds) as one feature element and time as another feature element. In certain embodiments, the space feature may include longitude and latitude coordinates or multi-dimensional coordinates (e.g., x, y, z coordinates) whereby some precision may be to the meter or greater. In certain embodiments, the time feature may include a date, a timestamp with hour, minute, second precision and in some cases maybe even greater precision (milliseconds). Each record 160 also has a record identifier ("record ID") and a unique entity identifier (which identifies an entity 180 with which the record 160 is associated).

In the data store 150, there are records 160 coming from observations (such as observations 184) (transactions being produced by sensors or collection systems). These transactions may have space, time, and other features. Records 160 representing collections of transactions (sometimes one, sometimes more) are conjoined from time-to-time as resolved entities. These conjoined (resolved) records 160 are the assertions. The way multiple records 160 are conjoined involves these records 160 sharing a surrogate key (common unique entity identifier, e.g., incrementing serial number) that is assigned by the entity resolution system 110. Thus, each entity resolution assertion 170 is a record 160 or a set of conjoined records 160, and each such assertion is deemed a discrete entity.

The entity resolution system 110 uses the space-time feature 162 as a feature of identity. In certain embodiments, the space-time feature 162 is used to increase confidence of entity resolution assertions 170. Moreover, despite previously existing records 160 and related historical assertions, the entity resolution system 110 uses newly learned space and time features to reevaluate and reverse earlier entity resolution assertions 170.

With embodiments, the entity resolution system 110 performs entity resolution with high confidence based on the space-time feature 162, even if other features 164 may disagree. With embodiments, the entity resolution system 110 may deny entity resolution based on the space-time feature 162, even if other features 164 provide strong evidence that two records 160 should be resolved into one entity.

With embodiments, the entity resolution system 110 receives new records 160 containing new space-time features 162 about an existing entity. Then, the entity resolution system 110 determines if any two entities (previously determined as different) are actually the same entity, in which case, the entity resolution system 110 corrects previously made entity resolution assertions 170 by now asserting the two discrete entities are the same (conjoining). In this way, the entity resolution system 110 changes earlier entity resolution assertions 170 based on new space-time features 162. Inversely, the entity resolution system 110 may receive a new record 160 with space time features 164 that reveal that conjoined records 160 previously asserted as a single resolved entity actually represent two or more discrete entities, in which case, the entity resolution system 110 corrects the previously made entity resolution assertions 170 by separating the records 160 into discrete entities.

Conjoined records 160 may also be referred to collapsed records 160. In certain embodiments, the conjoined records 160 are treated as a union, instead of being physically merged into one record 160. In certain alternative embodiments, the conjoined records 160 are physically merged into one record. In certain embodiments, the term "conjoined" describes keeping records 160 intact and loosely attached, such that the entity resolution system 110 can later separate the records 160 should new records 160 warrant such a correction to a previous entity resolution assertion 170.

With embodiments, when inbound records 160 are found to have a plurality of qualified entities (each with sufficient features to assert a resolution), the entity resolution system 110 evaluates features—differentiating those features more indirectly attributable (e.g., a land line phone number possibly shared by many) versus more directly attributable features (e.g., a passport number, typically assigned a single person) versus records 160 containing precise space time coordinates, which can be extremely attributable to a single entity.

Thus, the entity resolution system 110 uses the space-time feature 162 as an identity feature and makes entity resolution assertions 170 and/or reverses earlier entity resolution assertions 170. By using the space-time features 162 and other features 164, the entity resolution system 110 achieves higher accuracy than entity resolution systems that do not consider space-time features 162. Space time enabled entity resolution allows organizations to detect conditions whereby the non-space/time related features suggest entities are same or not same, however, when space/time features 162 are considered, it becomes evident otherwise.

Figure 2B:
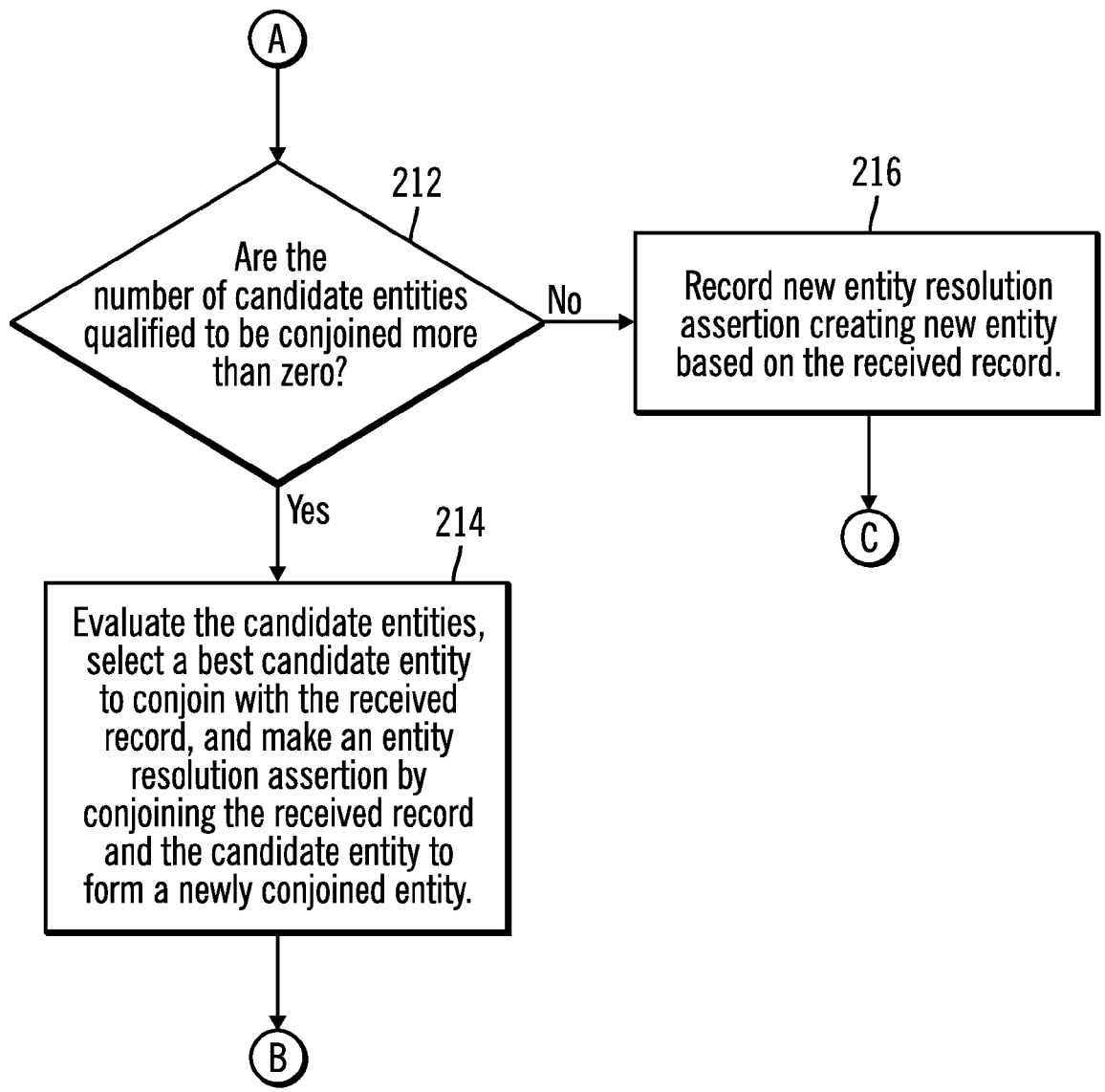

FIG. 2 illustrates logic for performing entity resolution in accordance with certain embodiments. Control begins in block 200 with the entity resolution system 110 receiving a (source) record 160 from a source system through a data transport, wherein the received record 160 has a space-time feature 162. In certain embodiments, the entity resolution system 110 pulls or retrieves the received record 160 from the source system. The entity resolution system 110 may retrieve the received record 160 from a source system through many different kinds of data transport techniques (e.g., Hyper-Text Transport Protocol (HTTP), File Transport Protocol (FTP), a database table, a message queue, a SOA (Service Oriented Architecture) interface, a file, etc.). The source system may be a system sensing the record 160 (e.g., a transaction from a credit card processor or a cellular company) or a secondary system receiving a secondary company of said record 160, a tertiary system, an operational data store, a data warehouse, etc. For example, a location of an ATM, a time of use of the ATM, and a name of a card inserted into the ATM may be received from a primary "system of record."

In block 202, the entity resolution system 110 optionally transforms the received record 160 into a format accepted by the data store 150. The entity resolution system 110 transforms (e.g., changes or standardizes) features using a feature appropriate technique. For example, there are different ways in which space can be described, such as physical address, latitude/longitude, distance from a landmark, etc. Thus, the space feature is transformed into whichever type of description the later executed comparison techniques use to determine same-ness (i.e., how close or "same" two features are). As another example, time may be described in many different formats. An example of transforming time is to take 12:05 AM PST Jan. 1, 2010 and transform it to DD/MM/YYYY HH:mm:ss:ms Greenwich Mean Time (GMT). In another embodiment, the source system may provide the entity resolution system 110 records 160 already in the format accepted by the entity resolution system 110.

In block 204, the entity resolution system 110 optionally stores the transformed record 160 in the data store 150, where the record 160 persists. In certain embodiments, instead of storing the record 160 upon receipt, the entity resolution system 110 uses the record 160 to perform entity resolution, and then the record 160 is written with an associated entity resolution assertion 170.

In block 206, the entity resolution system 110 selects candidate entities using features of the received record 160. In certain embodiments, the entity resolution system 110 identifies candidate entities 182 that have records 160 in the data store 150. In certain embodiments, for performance and scalability reasons, the entity resolution system 110 may select candidate entities based on more discriminating features (e.g., passport number and address). Discriminating features may be described as features that have a low frequency (e.g., such as a passport number because only one person should have the particular passport number). Discriminating features may be space-time features 162 and/or other features 164. Candidate entities are found using features (or partial features or compound features, or complex conjoined subsets of features) of the received record 160. Entities with similar (same or close in value) features already stored in the data store 160 may become qualified candidate entities. In certain embodiments, the discriminating features include space-time features. In certain alternative embodiments, the features include space-time features as well as non-space-time features to find candidate entities. For example, at this point, the entity resolution system 110 may select eight candidate entities.

In block 208, the entity resolution system 110 compares features of the received record 160 against features of each of the candidate entities to generate confidence scores for each feature of each of the candidate entities. The entity resolution system 110 uses feature-appropriate techniques to determine same-ness and close-ness of features of the received record 160 and features of the candidate entities. This information is saved for future use. The confidence score is associated with a feature of a candidate entity and indicates how close the feature is to the feature of the received record 160. For example, if the received record 160 and the candidate entity have the same address in the address feature, then the confidence score for the address feature of the candidate entity is high. In another embodiment, deterministic (rule based) evaluation and probabilistic (statistical frequencies) may be used in any combination to determine whether an entity resolution assertion 170 should or should not take place.

For example, the following may represent features and their confidence scores: example feature scores Feature 1:
123 Main Street
Springfield, CA 98765
Address confidence score: 90
Feature: 3
John Q Doe
Full Name confidence score: 95
Given Name confidence score: 85
Surname confidence score: 100

Feature 2:
123 Main Street Suite 100
Springfield, CA 98765

Feature 4
John Quincy Doe

In block 210, the entity resolution system 110 applies resolution rules to determine whether the received record 160 belongs to (e.g., is the same as) a candidate entity or a new entity based on the features and their confidence scores. With this processing, the entity resolution system 110 looks for possible candidate entities with which the received record 160 is to be conjoined. In certain embodiments, the received record 160 is conjoined with a candidate entity based on the presence of two records 160 confirming the entity was in the same space at the same time. As an example, if initially eight possible candidate entities were selected, then, after the processing of block 210, it will be determined which candidate entities, if any, may be considered the same. The processing of block 210 takes into account one or more space-time features 162 as well as other (non space-time) features 164. That is, the entity resolution system 110 checks whether the space-time features 162 and other features 164 are in agreement, plausible, or in disagreement. In certain embodiments, space-time features 162 take precedence over other features 164. In alternative embodiments, the analysis of space-time features 162 may come in later processing.

In block 212, the entity resolution system 110 determines whether the number of candidate entities qualified to be conjoined is more than zero. If so, processing continues to block 214, otherwise, processing continues to block 216.

Figure 2C:
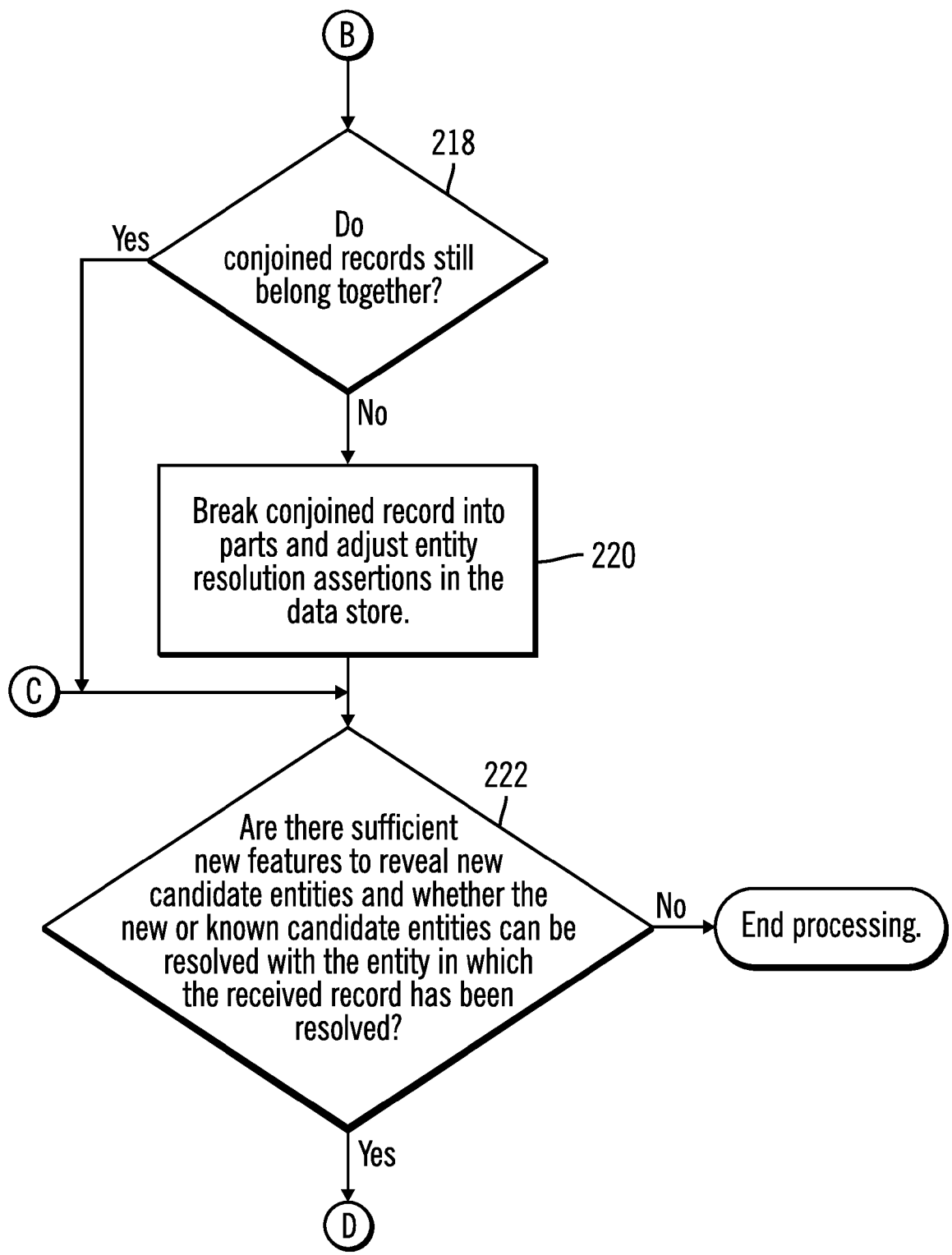

In block 216, the entity resolution system 110 records a new entity resolution assertion 170 by creating a new entity based on the received record 160. In particular, the entity resolution system 110 determines that the received record 160 does not match any existing candidate entity. In certain embodiments, the entity resolution system 110 identifies at least one candidate entity that matches the received record 160 based on features that may or may not include a space-time feature 162. Note that applying resolution rules 210 considers space-time feature 162 analysis such that the entity resolution system 110 may override a resolution assertion 170 using a disagreement between the space-time feature 162 of the received record 160 and the at least one candidate entity. For example, if the space feature of the received record 160 and the at least one candidate entity present a space-time feature 162 conflict, the entity resolution system 110 denies an entity resolution assertion 170. Then, in block 216, the entity resolution system 110, based on the denial, makes an entity resolution assertion 170 that the received record 160 is not the same as the candidate entity and as such creates a new entity. From block 216, processing continues to block 228 (FIG. 2C).

In block 214, the entity resolution system 110 evaluates the candidate entities, selects a best candidate entity to conjoin with the received record 160, and makes an entity resolution assertion 170 by conjoining the received record 160 and the candidate entity to form a newly conjoined entity. Thus, the entity resolution system 110 also determines which possible conjoin is the best conjoin taking into account the space-time features 162 and other features 164. That is, making the entity resolution assertion 170 may be described as storing the features 162, 164 of the received record 160 with the same unique entity identifier (e.g., unique entity serial number (surrogate key)), which represents the known entity and is shared across the previously conjoined records 160, in the data store 150. The following Table A is an example of a conjoined record 160 that includes two records 160 (with record identifiers "1" and "2") for an entity with entity identifier "1":

TABLE A

| RECORD IDENTIFIER | ENTITY IDENTIFIER | ... |
|---|---|---|
| 1 | 1 | |
| 2 | 1 | |

In Table A, the ellipses represent that zero or more columns may be included to represent features 162, 164. The above Table A represents a simplified example of how the assertion is recorded in the data store 150. Records 160 are conjoined into entities. Records 160 are assigned entity identifiers to indicate which records 160 are "members" (or conjoined into common entities). If a received record 160 does not resolve to an existing entity, it is assigned a new entity identifier (e.g., the next available unique entity serial number, which, in the above example, is the number 2). From block 214, processing continues to block 218 (FIG. 2C).

In block 218, the entity resolution system 110 determines whether the conjoined records 160 belong together. If so, processing continues to block 220, otherwise, processing continues to block 222, otherwise, processing continues to block 220.

For example, the resolved entity (conjoined records 160) may now contain some records 160 that can be determined to no longer belong to the resolved entity. In other words, newly received records 160 may have been conjoined into an entity that now reveal other records 160 in that entity that no longer belong and as such may need to be removed. The entity resolution system 110 checks to see if all the parts of all of the records 160 of a conjoined entity still belong together. In certain embodiments, records 160 previously asserted as same (and conjoined) are removed from an entity because of newly learned space-time features 162 and/or other features 164. By way of example, the entity resolution system 110 determines that a member record 160 (of an entity) itself containing a space time feature 162 could not be in two places at the same time (or similarly two very distant places in the same hour e.g., Singapore versus NY). In certain embodiments, in the event of conflicting features 162, 164, the entity resolution system 110 may favor the space-time features 162 over other time features 164.

In block 220, entity resolution system 110 breaks the conjoined record 160 into parts and adjusts entity resolution assertions 170 in the data store 160.

In block 222, the entity resolution system 110 determines whether there are sufficient new features 162, 164 to reveal new candidate entities and whether the new or known candidate entities can in fact be resolved with the entity in which the received record 160 has been resolved. If so, processing goes to block 206 (FIG. 2A), otherwise, processing is done. Thus, the entity resolution system 110 may use the newly learned information to conjoin the conjoined record 160 with another candidate entity. Thus, in certain alternative embodiments, the entity resolution system 110 determines whether the conjoined entity resolves to one or more of the remaining candidate entities, and the entity resolution system 110 makes an entity resolution assertion 170 that the conjoined entity is the same as a remaining candidate entity. And alternatively, if it is learned a previously received record 160 previously resolved, no longer belongs, the record 160 is removed by the entity resolution system 110.

By way of example, space-time features 162 may be co-mingled across a wide array of received record 160 types such as service subscriptions, bank Automatic Teller Machines (ATMs), point of sale transactions, on-line account maintenance at a web site that sells products and/or services, geolocation tags from cell providers, and so on.

Some transactions (records 160) contain a higher certainty of presence than other transactions, and using these space/time features 162 to conjoin a diverse set of records 160 from diverse source systems, the entity resolution system 110 is able to detect disagreement in identity—e.g., someone using your identity 27 miles from where you are at this moment (or even a moment ago say within a few minutes).

With reference to the space-time features 162, some transactions have more certainty of presence than others (i.e., the space feature 162 is available with a degree of precision). For example, in the following situations, it is possible to obtain space-time features 162 during a transaction (the creation of a record 160): use of an ATM machine when a bank card and pin are supplied by the consumer as the ATM machine can be assigned very specific longitude and latitude coordinates (e.g., sub-meter precision), boarding a plane because the airport has geo-coordinates, a login from a home computer because the computer is known to reside at a physical address, a point of sale transaction because the terminal has geo-locational coordinates or a cell phone location (via trilateration, the Global Positioning System (GPS), WiFi® proximity or with other locational coordinates). (WiFi is a trademark of Wi-Fi Alliance (WFA) in the United States, other countries, or both.)

Building on the certainty of presence notion, imagine if everyone carried a cell phone with GPS at all times. Then at any given point in time, it is technically feasible to know when there is a single entity in a wide area (e.g., only one person within a particular five square mile radius). Also, Unmanned Aerial Vehicles (UAVs) using multi-spectrum analysis may be able to produce certainty of singularity (e.g., identifying that there is one tank in the battlefield). Notably, as singularity of entities over an area becomes knowable, the certainty of presence created by other sensors becomes less important. For example, one sensor indicates there is only one tank within 20 miles and another sensor says there is a tank at a latitude/longitude/time that is plus or minus 5 miles. In such a case, the two entities could be asserted as same.

Some data sources (e.g., GPS-based devices, such as a cell phone, a car with the OnStar® system, and so on) that collect transaction information are self-aware of space time and as such can emanate transactions containing such features. (OnStar is a trademark of OnStar, LLC in the United States, other countries, or both.) However, some data sources that collect transaction information cannot produce a space time feature 162 (e.g., a dumb point-of-sale register at a convenience store). For data collection systems that are space/time unaware, the entity resolution system 110 may be able to obtain space (e.g., latitude and longitude coordinates) and time (e.g., a timestamp) to generate a space time feature 160. For example, a known terminal identifier at a known merchant location may be assigned a latitude/longitude via a lookup table. As another example, the time feature may be a timestamp added by the entity resolution system 110 in real-time to the transactional data if the data source does not collect time features (e.g., streaming video).

During entity resolution assertion 170 the evaluation of space-time features 162 must take into account distance precision (e.g., a latitude/longitude versus a city or country precision) and time precision (e.g., time to the second versus time to the day of the month) which may include processing in one embodiment as follows:

Space Feature and Time Feature Values:
Date value
Date precision (+/−)
Date precision units
Time precision (+/−)
Time precision units (e.g., Hrs, Min, Sec)
Lat/Long value
Lat/Long precision (+/−)

Lat/Long precision units (e.g., inches, feet, miles)
Computed Values:
Maximum distance between Transaction A and B
Maximum time between Transaction A and B
Speed of travel needed
Unlikely speed (e.g., speed required >600 mph)
Airplane required (e.g., speed required >60 mph)
Maximum distance Transaction A to nearest airport
Maximum distance Transaction B to nearest airport
Time needed to commute to airport
Minimum time needed to clear airports (e.g., 30 min)
Time needed to fly direct
Best-case commute time Determining that a record 160 resolves to a known entity may take into account other features 164 and also space time features 164 which may include precision. By way of example, a human may be located to a geo-coordinate (x, y, and z) with precision of maybe inches (basically representing the location of their human heart). Therefore, in certain embodiments, when using the space-time features 162 to perform entity resolution assertions 170, the entity resolution system 110 also uses the notion of "a certainty of singularity of entities" to perform entity resolution.

For example, when standing at an ATM machine, one data source is the ATM transaction itself. The ATM transaction contains a card number of a card, a name on the card, card related data known to be associated with the card, a terminal number of the ATM, a password, etc. For this example, the geo-coordinate of some precision is plus or minus three feet such that a person is able to push the buttons on the ATM. However, there may be six people around the ATM at a particular time. In this case, the space feature and time feature precision may not be sufficient to make an entity resolution assertion 170. However, the entity resolution system 110 may use the notion of "certainty of singularity". That is, imagine during the ATM transaction, a video camera captures the general ATM space. The entity resolution system 110 may use the data from the video camera to reveal the total number of entities around the ATM. If there is one discernable entity at the ATM, then, the transaction can be ascribed to a single entity as there is certainty that the transacting entity (creating the record 160) is the entity captured with the video camera. While the transacting entity is likely the authorized card holder (e.g., not a relative or not someone using a stolen card and pin number), and while the transacting entity may be treated for the time being as the same person as the card holder (which may or may not be true), no matter what is discovered later about the transacting party, the entity resolution system 110 is able to make the entity resolution assertion 170 that the person on the video camera is the person (whoever they are) at the ATM at that particular time.

FIG. 3 illustrates a sample data set 300 in accordance with certain embodiments. The sample data set is represented as a table with columns and rows. The columns are for: System Number—Record Number, Transaction Number, Name, Address, and Phone Number. Each row may be described as a record in a system (i.e., System 1 or System 2). System 1 and System 2 may each be generated by any type of computing system (e.g., database system or transaction system).

The entity resolution system 110 may resolve the FIG. 3 transactions, without any availability of space-time features 162, into the following two entities and output the following entity resolutions:
 Entity 1 (S1R1, S2R1)
 Entity 2 (S1R2)

FIG. 4 illustrates a sample data set 400 including a space time feature 162 in accordance with certain embodiments. The sample data set is represented as a table with columns and rows. The columns are for: System Number—Record Number, Transaction Number, Name, Address, Phone Number, Date, Time, and Space (geo-location). With reference to data set 400, record S1R1 contains a space time feature 162 of high certainty of: Date: 12/31/09, Time: 11:58:02, and Space: N//119:46:05:W//14:40:20 and record S2R1 contains a space-time feature 162 of high certainty of: Date: 12/31/09, Time: 11:58:07, Space: N//122:23:36:W//14:37:11. The entity resolution system 110 concludes that records S1R1 and S2R1 could not be for the same entity and, hence, asserts that these are records 160 for two different entities.

With reference to data set 400, should record S1R1 contains a space time feature 162 with certainty of presence and a certainty of singularity (only a single entity in reasonable proximity) of: Date: 12/31/09, Time: 11:58:02, and Space: N//119:46:05:W//14:40:20, and record S1R2 contains a space time feature 162 with certainty of presence and certainty of singularity containing: Date: 12/31/09, Time: 11:58:02, and Space: N//119:46:05:W//14:40:20. That is, on 12/31/09, at 11:58:02, the entities associated with records S1R1 and S1R2 were in precisely the same space (N//119:46:05:W//14:40:20) and no other entities were near. With this data, the entity resolution assertion 170 may conclude that the two records in the data set 400 resolve to the same entity and outputs the following entity resolution:
 Entity 1 (S1R1, S1R2)

Moreover, the entity resolution system 110 may change previous entity resolution assertions 170 (e.g., previously assigned records 160 may be reassigned to new entities) as new space-time features 162 are received in the future. For example, assume that the entity resolution system 110 originally output the following entity resolutions:
 Entity 1 (S1R1, S2R1)
 Entity 2 (S1R2)

Continuing with this example, assume that record S1R1 originally came with a space time feature 162, and, later, the original record S2R1 is modified, eliminating the original space time feature 162, in place of a conflicting space time feature 162. Based on the changed information, entity resolution assertion 170 may split the entity into two entities (e.g., they may be junior and senior members of a family) to output the following entity resolutions:
 Entity 1 (S1R1)
 Entity 2 (S1R2)
 Entity 3 (S2R1)

Again, continuing with the example, assume that the record S1R2 is modified to include a new space time feature 162 and there is reliable data about singularity of entities. If the entity resolution system 110 determined that the space time feature 162 was consistent with space-time features 162 found on records 160 in conjoined Entity 1, the entity resolution system 110 makes a new entity resolution assertion 170 (reversing the earlier entity resolution assertion 170) to output the following entity resolutions:
 Entity 1 (S1R1, S1R2)
 Entity 3 (S2R1)

In this example, Entity 2 was absorbed into Entity 1 (e.g., records S1R1 and S1R2 be come conjoined).

FIG. 5 illustrates a sample credit card record 500 in accordance with certain embodiments. FIG. 6 illustrates a sample airline reservation record 600 in accordance with certain embodiments. FIG. 7 illustrates a sample vehicle registration record 700 in accordance with certain embodiments. The entity resolution system 110 may initially conjoins the records 500, 600, and 700 together to output the following conjoined entity:

Entity 1 (S1R1, S3R1, S4R1, S5R1)

FIG. 8 illustrates a sample passenger boarding record 800 in accordance with certain embodiments. For the purposes of this example, there is inconclusive information to for the entity resolution assertion 170 to claim S6R1 is the same as Entity 1, hence the entity resolution system 110 creates a new entity:

Entity 1 (S1R1, S3R1, S4R1, S5R1)
Entity 3 (S6R1)

FIG. 9 illustrates a sample bridge toll record 900 in accordance with certain embodiments. For the purposes of this example, it is may be assumed that the registered vehicle may be attributable to Mike Smith. However, the entity resolution system 110 determines that the bridge toll record may not conjoin with Entity 1 as there is a space time feature 162 conflicts (i.e., the same Mike Smith could not have boarded an airplane in Oakland bound for France and then driven across the bridge 10 minutes later). As such, the entity resolution system 110 outputs the following entity resolutions:

Entity 1 (S1R1, S3R1, S4R1, S5R1)
Entity 4 (S7R1)

Thus, the entity resolution system 110 evaluates received records 160 against all previously seen records 160 in data store 150. The entity resolution system 110 bundles records 160 when reflecting like entities (e.g., and as such features 162, 164 accumulate). Newly received records 160 may cause earlier entity resolution assertions 170 to be reversed. Records 160 previously asserted as belonging to two discreet entities may later become one (i.e., be conjoined), and multiple records 160 for one entity may later be separated into a plurality of entities. The entity resolution system 110 often provides real-time results.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to TCPIP, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server, or some or all components may reside or use a cloud compute facility. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc.

Figure 10:
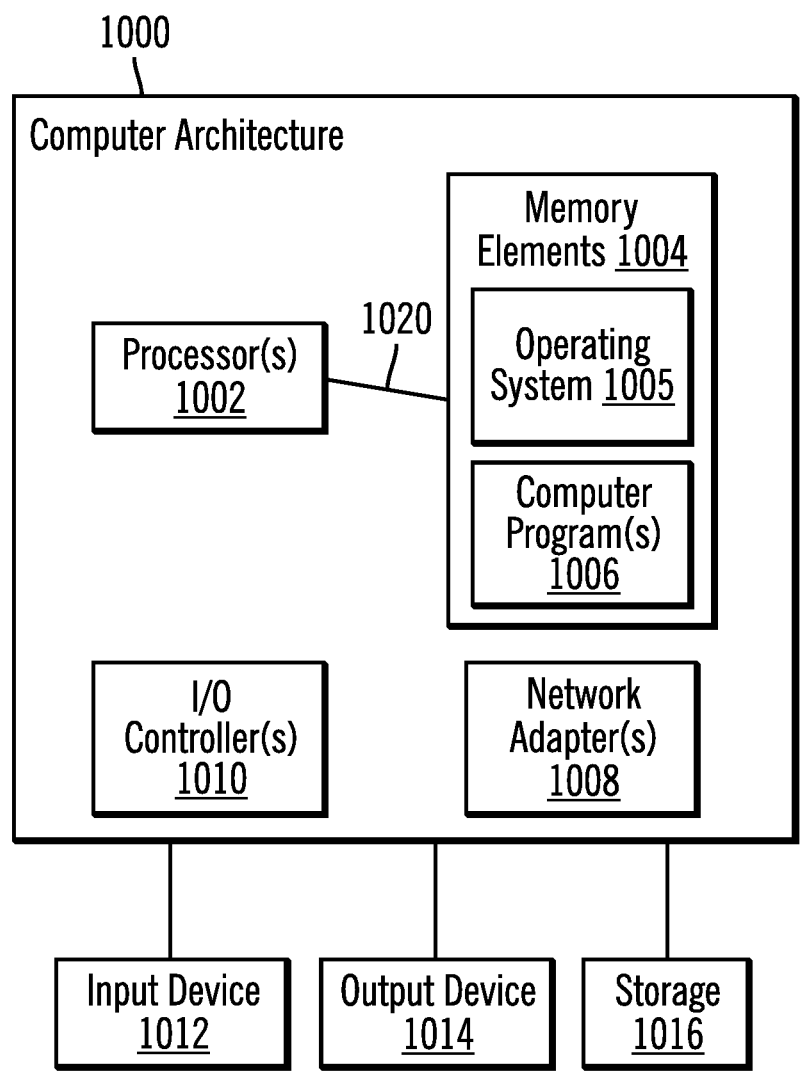
FIG. 10 illustrates a computer architecture that may be used in accordance with certain embodiments.

FIG. 10 illustrates a computer architecture 1000 that may be used in accordance with certain embodiments. Computing device 100 may implement computer architecture 1000. The computer architecture 1000 is suitable for storing and/or executing program code and includes at least one processor 1002 coupled directly or indirectly to memory elements 1004 through a system bus 1020. The memory elements 1004 may include local memory employed during actual execution of the program code, bulk storage, and cache memories which provide temporary storage of at least some program code in order to reduce the number of times code must be retrieved from bulk storage during execution. The memory elements 1004 include an operating system 1005 and one or more computer programs 1006.

Input/Output (I/O) devices 1012, 1014 (including but not limited to keyboards, displays, pointing devices, etc.) may be coupled to the system either directly or through intervening I/O controllers 1010.

Network adapters 1008 may also be coupled to the system to enable the data processing system to become coupled to other data processing systems or remote printers or storage devices through intervening private or public networks. Modems, cable modem and Ethernet cards are just a few of the currently available types of network adapters 1008.

The computer architecture 1000 may be coupled to storage 1016 (e.g., a non-volatile storage area, such as magnetic disk drives, optical disk drives, a tape drive, etc.). The storage 1016 may comprise an internal storage device or an attached or network accessible storage. Computer programs 1006 in storage 1016 may be loaded into the memory elements 1004 and executed by a processor 1002 in a manner known in the art.

The computer architecture 1000 may include fewer components than illustrated, additional components not illustrated herein, or some combination of the components illustrated and additional components. The computer architecture 1000 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

The invention claimed is:

1. A method, comprising:
  receiving, with a computer including a processor, a record, wherein the received record has a space-time feature indicating a first location of an entity and a first time at which the entity is at the first location; and
  in response to a space-time analysis determining that the first location of the entity matches a second location of a candidate entity to a space precision based on a distance of the first location and the second location from a set of coordinates and that the first time at which the entity is at the first location matches a second time at which the candidate entity is at the second location to a time precision based on the first time and the second time being within a specified period of time,
    determining that the entity and the candidate entity are a same entity;
    determining that the received record should be conjoined with a candidate record for the candidate entity; and
    making an entity resolution assertion by conjoining the received record and the candidate record to form a newly conjoined entity.

2. The method of claim 1, further comprising:
  selecting the candidate entity using the space-time feature and at least one additional feature of the received record.

3. The method of claim 1, further comprising:
generating a new entity resolution assertion based on determining that the received record should be conjoined with a new candidate entity based on a feature other than the space-time feature;
overriding the new entity resolution assertion based on a disagreement between the space-time feature of the received record and at least one space-time feature of the new candidate entity; and
based on the disagreement, making an assertion that the entity and the new candidate entity are not the same entity.

4. The method of claim 1, further comprising:
prior to making the entity resolution assertion by conjoining the received record and the candidate entity record to form a newly conjoined entity, determining that a different candidate entity and the candidate entity that are not the same entity; and
after making the entity resolution assertion by conjoining the received record and the candidate entity record to form a newly conjoined entity,
performing space-time analysis to identify the different candidate entity as a candidate for the newly conjoined entity; and
making an entity resolution assertion that the newly conjoined entity and the different candidate entity are the same entity based on the space-time feature of the received record.

5. The method of claim 1, further comprising:
performing the space-time analysis to determine whether any previously resolved records in the newly conjoined entity no longer belong to that newly conjoined entity based on a space-time feature for the newly conjoined entity; and
separating a previously resolved record that no longer belongs in the newly conjoined entity.

6. The method of claim 1, wherein the candidate entity is at least one of a person, thing or place.

7. The method of claim 1, wherein the space feature includes the distance precision, and wherein the space-time analysis compares the first location and the second location while taking the distance precision into account.

8. The method of claim 1, wherein the time feature includes the time precision, and wherein the space-time analysis compares the first time and the second time while taking the time precision into account.

9. A system, comprising:
a processor; and
a storage device coupled to the processor, wherein the storage device stores a computer readable program, and wherein the processor is configured to execute the computer readable program to perform operations, the operations comprising:
receiving a record, wherein the received record has a space-time feature indicating a first location of an entity and a first time at which the entity is at the first location; and
in response to a space-time analysis determining that the first location of the entity matches a second location of a candidate entity to a space precision based on a distance of the first location and the second location from a set of coordinates and the first time at which the entity is at the first location matches a second time at which the candidate entity is at the second location to a time precision based on the first time and the second time being within a specified period of time,
determining that the entity and the candidate entity are a same entity;
determining that the received record should be conjoined with a candidate record for the candidate entity; and
making an entity resolution assertion by conjoining the received record and the candidate record to form a newly conjoined entity.

10. The system of claim 9, wherein the operations further comprise:
selecting the candidate entity using the space-time feature and at least one additional feature of the received record.

11. The system of claim 9, wherein the operations further comprise:
generating a new entity resolution assertion based on determining that the received record should be conjoined with a new candidate entity based on a feature other than the space-time feature;
overriding the new entity resolution assertion based on a disagreement between the space-time feature of the received record and at least one space-time feature of the new candidate entity; and
based on the disagreement, making an assertion that the entity and the new candidate entity are not the same entity.

12. The system of claim 9, wherein the operations further comprise:
prior to making the entity resolution assertion by conjoining the received record and the candidate entity record to form a newly conjoined entity, determining that a different candidate entity and the candidate entity that are not the same entity; and
after making the entity resolution assertion by conjoining the received record and the candidate entity record to form a newly conjoined entity,
performing space-time analysis to identify the different candidate entity as a candidate for the newly conjoined entity; and
making an entity resolution assertion that the newly conjoined entity and the different candidate entity are the same entity based on the space-time feature of the received record.

13. The system of claim 9, wherein the operations further comprise:
performing the space-time analysis to determine whether any previously resolved records in the newly conjoined entity no longer belong to that newly conjoined entity based on a space-time feature for the newly conjoined entity; and
separating a previously resolved record that no longer belongs in the newly conjoined entity.

14. The system of claim 9, wherein the candidate entity is at least one of a person, thing or place.

15. The system of claim 9, wherein the space feature includes the distance precision, and wherein the space-time analysis compares the first location and the second location while taking the distance precision into account.

16. The system of claim 9, wherein the time feature includes the time precision, and wherein the space-time analysis compares the first time and the second time while taking the time precision into account.

17. A computer program product comprising a computer readable storage medium including a computer readable program, wherein the computer readable program when executed by a processor on a computer causes the computer to:

receive a record, wherein the received record has a space-time feature indicating a first location of an entity and a first time at which the entity is at the first location; and in response to a space-time analysis determining that the first location of the entity matches a second location of a candidate entity to a space precision based on a distance of the first location and the second location from a set of coordinates and that the first time at which the entity is at the first location matches a second time at which the candidate entity is at the second location to a time precision based on the first time and the second time being within a specified period of time, determining that the entity and the candidate entity are a same entity;

determine that the received record should be conjoined with a candidate record for the candidate entity; and make an entity resolution assertion by conjoining the received record and the candidate record to form a newly conjoined entity.

18. The computer program product of claim 17, wherein the computer readable program when executed by the processor on the computer causes the computer to:

select the candidate entity using the space-time feature and at least one additional feature of the received record.

19. The computer program product of claim 17, wherein the computer readable program when executed by the processor on the computer causes the computer to:

generating a new entity resolution assertion based on determine that the received record should be conjoined with a new candidate entity based on a feature other than the space-time feature;

override the new entity resolution assertion based on a disagreement between the space-time feature of the received record and at least one space-time feature of the new candidate entity; and based on the disagreement, make an assertion that the entity and the new candidate entity are not the same entity.

20. The computer program product of claim 17, wherein the computer readable program when executed by the processor on the computer causes the computer to:

prior to making the entity resolution assertion by conjoining the received record and the candidate entity record to form a newly conjoined entity, determine that a different candidate entity and the candidate entity that are not the same entity; and after making the entity resolution assertion by conjoining the received record and the candidate entity record to form a newly conjoined entity, perform space-time analysis to identify the different candidate entity as a candidate for the newly conjoined entity; and make an entity resolution assertion that the newly conjoined entity and the different candidate entity are the same entity based on the space-time feature of the received record.

21. The computer program product of claim 17, wherein the computer readable program when executed by the processor on the computer causes the computer to:

perform the space-time analysis to determine whether any previously resolved records in the newly conjoined entity no longer belong based on a space-time feature for the newly conjoined entity; and separate a previously resolved record that no longer belongs in the newly conjoined entity.

22. The computer program product of claim 17, wherein the candidate entity is at least one of a person, thing or place.

23. The computer program product of claim 17, wherein the space feature includes the distance precision, and wherein the space-time analysis compares the first location and the second location while taking the distance precision into account.

24. The computer program product of claim 17, wherein the time feature includes the time precision, and wherein the space-time analysis compares the first time and the second time while taking the time precision into account.

* * * * *